(12) United States Patent
Lu et al.

(10) Patent No.: US 9,167,500 B2
(45) Date of Patent: Oct. 20, 2015

(54) METHOD, DEVICE, AND SYSTEM FOR SELECTING RELAY TYPE

(71) Applicant: Huawei Technologies Co., LTD, Shenzhen (CN)

(72) Inventors: Jianmin Lu, Shanghai (CN); Li Chai, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 411 days.

(21) Appl. No.: 13/887,124

(22) Filed: May 3, 2013

(65) Prior Publication Data

US 2013/0242793 A1 Sep. 19, 2013

Related U.S. Application Data

(63) Continuation of application No. PCT/CN2011/081714, filed on Nov. 3, 2011.

(30) Foreign Application Priority Data

Nov. 4, 2010 (CN) .......................... 2010 1 0538185

(51) Int. Cl.
*H04B 7/208* (2006.01)
*H04W 40/22* (2009.01)
*H04W 84/04* (2009.01)
*H04W 28/04* (2009.01)
*H04W 48/08* (2009.01)
*H04W 72/02* (2009.01)

(52) U.S. Cl.
CPC ............ *H04W 40/22* (2013.01); *H04W 84/047* (2013.01); *H04W 28/048* (2013.01); *H04W 48/08* (2013.01); *H04W 72/02* (2013.01)

(58) Field of Classification Search
CPC . H04W 28/048; H04W 40/22; H04W 84/047; H04W 48/08
USPC ............... 370/319, 331, 349, 310.2, 328, 338
See application file for complete search history.

(56) References Cited

U.S. PATENT DOCUMENTS

2008/0299897 A1 12/2008 Mohebbi
2012/0307715 A1* 12/2012 Maeda et al. ................. 370/315

FOREIGN PATENT DOCUMENTS

| CN | 101188816 A | 5/2008 |
| CN | 101389140 A | 3/2009 |
| CN | 101651950 A | 2/2010 |

(Continued)

OTHER PUBLICATIONS

Alcatel-Lucent, "[70B#15]-LTE: Who determines RN Type/ subframe partitioning and how is this communicated," 3GPP TSG-RAN WG2 Meeting #71, Madrid, Spain, Aug. 23-27, 2010, 11 pages.

(Continued)

*Primary Examiner* — Brenda H Pham
(74) *Attorney, Agent, or Firm* — Slater & Matsil, L.L.P.

(57) ABSTRACT

Embodiments of the present invention provide a method, a device, and a system for selecting a relay type. A relay node selects a Un interface frequency band with an optimal signal according to frequency bands supported on a Un interface. The relay node determines a relay type according to the selected Un interface frequency band and a configured Uu interface frequency band and sends indication information to a DeNB. The indication information includes the selected Un interface frequency band and the relay type.

20 Claims, 6 Drawing Sheets

(56) References Cited

FOREIGN PATENT DOCUMENTS

CN    101656983 A    2/2010
WO    2007133135 A1   11/2007

OTHER PUBLICATIONS

Extended European Search Report received in Application No. 11837583.1-1854 mailed Oct. 28, 2013, 12 pages.
Huawei, "Consideration on RN Type Decision Issue," 3GPP TSG-RAN WG2 Meeting #71, R2-104701, Madrid, Spain, Aug. 23-27, 2010, 4 pages.
Huawei, "RSRP/RSRQ Use cases in Relay backhaul link," 3GPP TSG-RAN WG4 Meeting #56, R4-103005, Madrid, Spain, Aug. 23-27, 2010, 2 pages.
3rd Generation Partnership Project: Technical Specification Group Radio Access Network; Evolved Universal Terrestrial Radio Access (E-Utra): and Evolved Universal Terrestrial Radio Access Network (E-UTRAN); Overall description: Stage 2 (Release 10) 3GPP TS 36.300 V10.1.0, Sep. 2010, 192 pages.
3rd Generation Partnership Project: Technical Specification Group Radio Access Network; Evolved Universal Terrestrial Radio Access (E-UTRA), User Equipment (UE) procedures in idle mode (Release 9) 3GPP TS 36.301 V9.4.0, Sep. 2010, 32 pages.
3rd Generation Partnership Project: Technical Specification Group Radio Access Network; Evolved Universal Terrestrial Radio Access (E-UTRA); Radio Resource Control (RRC); Protocol specification (Release 9), 3GPP TS 36.331 V9.4.0, Sep. 2010, 252 pages.
International Search Report received in Application No. PCT/CN2011/081714 mailed Jan. 19, 2012, 3 pages.
Written Opinion of the International Searching Authority received in Application No. PCT/CN2011/081714 mailed Jan. 19, 2012, 10 pages.

\* cited by examiner

METHOD, DEVICE, AND SYSTEM FOR SELECTING RELAY TYPE

CROSS-REFERENCE TO RELATED APPLICATIONS

This application is a continuation of International Application No. PCT/CN2011/081714, filed on Nov. 3, 2011, which claims priority to Chinese Patent Application No. 201010538185.3, filed on Nov. 4, 2010, both of which are hereby incorporated by reference in their entireties.

TECHNICAL FIELD

Embodiments of the present invention relate to communications technologies, and in particular, to a method, a device, and a system for selecting a relay type.

BACKGROUND

With development of communications technologies, International Mobile Telecommunications-Advanced (IMT-Advanced) technologies pose a very high requirement for system capacity. Supporting a high-capacity and large-bandwidth frequency spectrum, however, brings both a large path loss and a large penetration loss of a frequency band. To meet the capacity requirement of the IMT-Advanced, the 3rd Generation Partnership Project (3GPP) has put forward an LTE-Advanced system which uses a relay technology as one of candidate technologies to be researched for improving system capacity and coverage.

The relay technology is to add one or more relay nodes (RN) on a radio link between a donor Node B (DeNB) and a user equipment (UE), so that a radio signal between the DeNB and the UE is forwarded once or multiple times to implement replacement of a link of poor quality with two or more links of good quality so as to obtain higher link capacity and better coverage.

Currently, an RN supports two relay link modes: out-of-band relay, in which a relay link and an access link operate on different carriers; and in-band relay, in which the relay link and the access link operate on a same carrier. In-band relay is further classified into two types: in-band half-duplex (HD), in which there is no very strong interference isolation between a receive antenna and a transmit antenna, performance of a duplexer is not good, and a transceiver cannot perform simultaneous transmitting and receiving; and in-band full-duplex (FD), in which there is very strong interference isolation between the receive antenna and the transmit antenna, or performance of the duplexer is good, and the transceiver can perform simultaneous transmitting and receiving. That is, the relay node supports the preceding relay types.

In the prior art, an operator manually and statically configures an RN type at a network management system back-end of the RN when deploying and installing the RN. When the RN is powered on, an indication of the configured RN type is informed through signaling to a DeNB, so that the DeNB determines configuration information of the RN according to this indication.

In the existing method for statically configuring a relay type, reconfiguration or replacement of an RN is caused when a DeNB in a position where the RN is located has changed or when a RN deployed around is added or removed. Therefore, an operating cost for configuring the RN is high and configuration efficiency is low.

SUMMARY OF THE INVENTION

Embodiments of the present invention provide a method, a device, and a system for selecting a relay type so as to reduce an operating cost for configuring an RN and improve configuration efficiency.

In one aspect, an embodiment of the present invention provides a method for selecting a relay type, including selecting, by a relay node, a Un interface frequency band with an optimal signal according to frequency bands supported on a Un interface, and determining, by the relay node, a relay type according to the selected Un interface frequency band and a configured Uu interface frequency band, and sending indication information to a DeNB, where the indication information includes the selected Un interface frequency band and the relay type.

An embodiment of the present invention provides another method for selecting a relay type, including receiving, by a DeNB, indication information sent by a relay node, where the indication information includes a Un interface frequency band selected by the relay node and a relay type determined by the relay node, and reselecting, by the DeNB, according to the indication information, a Un interface frequency band and/or a relay type that corresponds to the relay node for the relay node.

In another aspect, an embodiment of the present invention provides a relay node, including a first processing module, configured to select a Un interface frequency band with an optimal signal according to frequency bands supported on a Un interface; and determine a relay type according to the selected Un interface frequency band and a configured Uu interface frequency band, and a first transceiving module, configured to send indication information to a DeNB, where the indication information includes the Un interface frequency band selected by the first processing module and the relay type determined by the first processing module.

An embodiment of the present invention further provides a DeNB, including a second transceiving module, configured to receive indication information sent by a relay node, where the indication information includes a Un interface frequency band selected by the relay node and a relay type determined by the relay node, and a second processing module, configured to reselect, according to the indication information received by the second transceiving module, a Un interface frequency band and/or a relay type that corresponds to the relay node for the relay node.

An embodiment of the present invention further provides a system for selecting a relay type, including a relay node and a DeNB, where the relay node is configured to select a Un interface frequency band with an optimal signal according to frequency bands supported on a Un interface; determine a relay type according to the selected Un interface frequency band and a configured Uu interface frequency band; and send indication information to the DeNB, where the indication information includes information of the selected Un interface frequency band and the relay type, and the DeNB is configured to receive the indication information sent by the relay node; and reselect, according to the indication information, a Un interface frequency band and/or a relay type that corresponds to the relay node for the relay node.

In the method, the device, and the system for selecting a relay type according to the embodiments of the present invention, an RN selects a frequency band with an optimal signal according to frequency bands supported on a Un interface and then determines a relay type; and a DeNB may switch the relay type determined by the RN, so that the relay type is adaptively selected according to quality and an interference
} condition of each of the frequency bands supported on the Un interface, thereby reducing an operating cost for configuring the RN and improving configuration efficiency.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
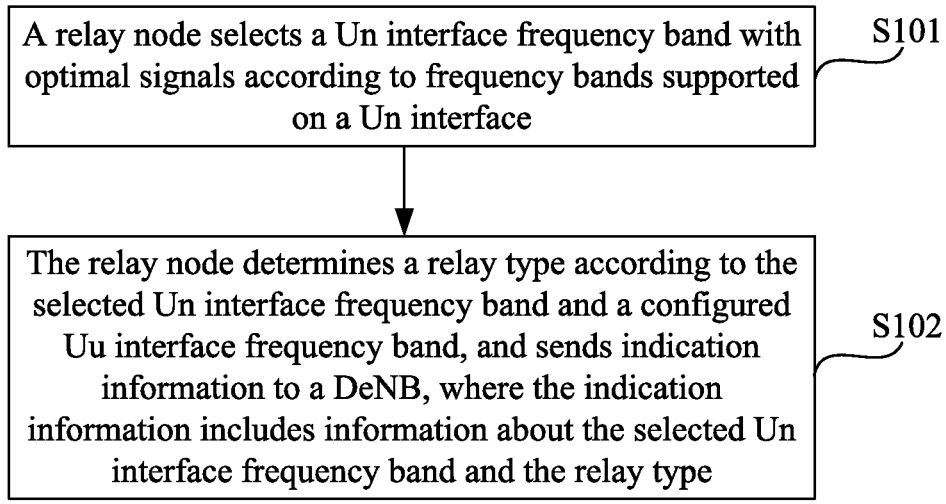
FIG. 1 is a flowchart of a first embodiment of a method for selecting a relay type according to the present invention.

FIG. 1 is a flowchart of a first embodiment of a method for selecting a relay type according to the present invention. As shown in FIG. 1, the method includes the following steps.

S101. A relay node selects a Un interface frequency band with an optimal signal according to frequency bands supported on a Un interface.

S102. The relay node determines a relay type according to the selected Un interface frequency band and a configured Uu interface frequency band, and sends indication information to a DeNB, where the indication information includes information of the selected Un interface frequency band and the relay type.

In the method for selecting a relay type according to this embodiment, the RN may select a relay type before establishing a connection with the DeNB, that is, when the RN is in an idle (idle) state; or the RN may also select the relay type after establishing the connection with the DeNB.

The RN selects the Un interface frequency band with the optimal signal according to frequency bands supported on the Un interface, where the Un interface frequency band with the optimal signal is an optimal frequency band supported on the Un interface. In descriptions of the embodiments of the present invention, a frequency band supported on the Un interface is simply called a Un interface frequency band. The selecting, by the RN, the Un interface frequency band with the optimal signal may be specifically as follows: measuring, by the RN, frequency bands that the RN supports on the Un interface, which mainly includes measuring reference signal received power (RSRP) and reference signal received quality (RSRQ) of each of the frequency bands, and selecting a frequency band with optimal RSRP and RSRQ from a measurement result. The RN may measure all frequency bands supported on the Un interface, and select a Un interface frequency band with an optimal signal; or the RN may measure several frequency bands supported on the Un interface, and then select a frequency band with an optimal signal from these frequency bands; or the RN may also measure several frequency bands starting from a frequency band used when the RN is powered off last time, and then select a frequency band with an optimal signal from these frequency bands. As can be seen, multiple manners are available for selecting an optimal Un interface frequency band and are not described one by one herein.

After selecting a frequency band with optimal signal quality, the RN may further select a cell with strongest signals on this Un interface frequency band and camp on (camps on) the selected cell to begin with an RN startup process.

Further, after selecting the Un interface frequency band, the RN determines a relay type according to the selected Un interface frequency band and the configured Uu interface frequency band, where the Uu interface frequency band is a frequency band supported on a Uu interface. In following descriptions, a frequency band supported on the Uu interface is simply called a Uu interface frequency band. The determining a relay type mainly depends on the Un interface frequency band and the Uu interface frequency band, where the Uu interface frequency band is configured in advance. This specifically includes the following: If the Un interface frequency band is different from the Uu interface frequency band, that is, a relay link and an access link operate on different carriers, the relay type is out-of-band relay; or if the Un interface frequency band is the same as the Uu interface frequency band, the relay type is in-band relay. In-band relay is further classified into in-band half-duplex and in-band full-duplex. This mainly depends on isolation between the relay link and the access link, that is, a degree of interference between the relay link and the access link. Therefore, the RN may further determine a type of in-band relay by starting a measurement of the isolation between the relay link and the access link.

After determining the relay type, the RN sends indication information to the DeNB, where the indication information includes the Un interface frequency band selected by the RN and the relay type determined by the RN.

After receiving the indication information sent by the RN, the DeNB may make a corresponding reply according to the relay type selected by the RN, or reselect a more appropriate Un interface frequency band and/or a relay type that corresponds to the RN for the RN.

In the method for selecting a relay type according to this embodiment, an RN selects a frequency band with an optimal signal according to frequency bands supported on a Un interface, and then determines a relay type, so that the relay type is adaptively selected according to quality and an interference condition of each of the frequency bands supported on the Un interface, thereby reducing an operating cost for configuring the RN and improving configuration efficiency.

Figure 2:
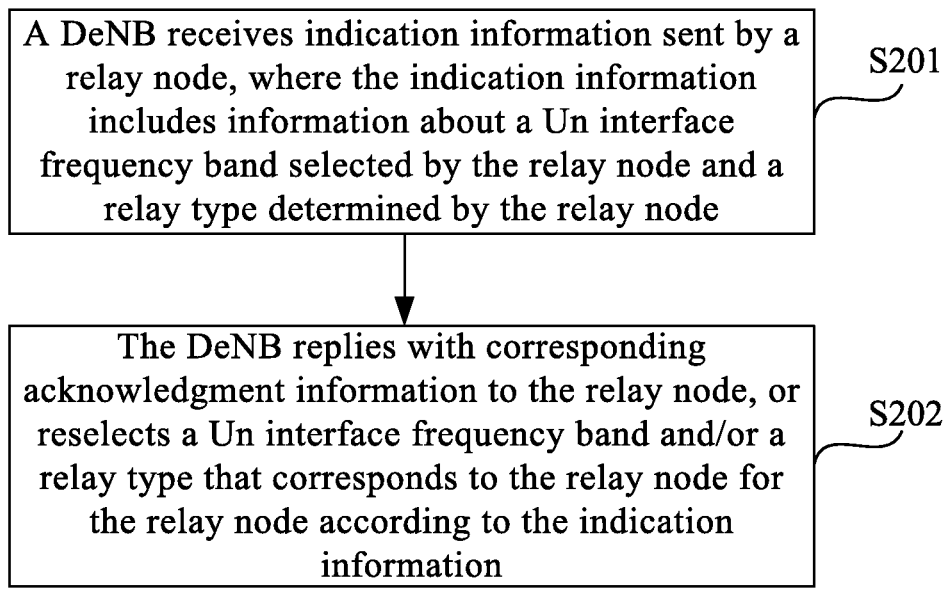
FIG. 2 is a flowchart of a second embodiment of the method for selecting a relay type according to the present invention.

FIG. 2 is a flowchart of a second embodiment of the method for selecting a relay type according to the present invention. As shown in FIG. 2, the method includes the following steps:

S201. A DeNB receives indication information sent by a relay node, where the indication information includes information of a Un interface frequency band selected by the relay node and a relay type determined by the relay node.

S202. The DeNB reselects, according to the indication information, a Un interface frequency band and/or a relay type that corresponds to the relay node for the relay node.

Specifically, the RN may select a relay type before establishing a connection with the DeNB, that is, when the RN is in an idle (idle) state; or the RN may select the relay type after establishing the connection with the DeNB.

Multiple selection manners may specifically be available for the RN to select a Un interface frequency band with an optimal signal according to frequency bands supported on a Un interface. For example, the RN may measure all frequency bands supported on the Un interface, and select a frequency band with an optimal signal; or the RN measures several frequency bands supported on the Un interface, and then selects a frequency band with an optimal signal from these frequency bands; or the RN measures several frequency bands starting from a frequency band used when the RN is powered off last time, and then selects a frequency band with an optimal signal from these frequency bands.

After selecting the Un interface frequency band, the RN may further select a cell with strongest signals on this Un interface frequency band and camp on the selected cell to begin with an RN startup process.

Further, the RN determines a relay type according to the selected Un interface frequency band and a configured Uu interface frequency band, and sends indication information that carries information of the relay type to the DeNB.

After receiving the indication information sent by the RN, the DeNB may directly reply with acknowledgment information to the RN; or the DeNB may make a corresponding reply according to the relay type selected by the RN. Specifically, if the relay type that the RN selects is out-of-band relay or a full-duplex type of in-band relay, the DeNB may perform corresponding configuration for the relay type and reply with corresponding configuration information to the RN; or if the relay type that the RN selects is a half-duplex type of in-band relay, the DeNB further needs to reallocate resources and then sends reconfiguration information to the RN. In addition, if the relay type that the RN selects is the half-duplex type of in-band relay, the DeNB further sends configuration information of a subframe used in a relay link to the RN.

The DeNB may reconfigure a Un interface frequency band and/or a relay type that corresponds to the RN for the RN according to system load distribution or certain measurement information that the DeNB has collected, such as information of each frequency band that the RN supports on the Un interface or an impact of other RNs on each Un interface frequency band. This may be specifically as follows: The DeNB directly selects a Un interface frequency band with strongest RSRP and optimal RSRQ for the RN according to the collected information of each frequency band. Since the RN may have already reported its Uu interface frequency band to the DeNB, the DeNB may directly reselect a Un interface frequency band for the RN, and/or re-determine a relay type for the RN; or the DeNB may also send the selected Un interface frequency band to the RN, so that the RN further determines a relay type according to the Uu interface frequency band. Alternatively, the DeNB selects multiple Un interface frequency bands with good signal quality and little interference for the RN, and then the RN further selects an optimal frequency band from these frequency bands and determines a corresponding relay type.

As can be seen, the DeNB may use multiple manners, which are not described one by one herein, to reselect a Un interface frequency band and/or a relay type that corresponds to the RN for the RN.

In the method for selecting a relay type according to this embodiment, a DeNB may reconfigure a Un interface frequency band and/or a relay type that corresponds to an RN for the RN according to indication information that is sent by the RN and includes a relay type, so that the relay type is adaptively selected according to quality and an interference condition of each frequency band supported on a Un interface, thereby reducing an operating cost for configuring the RN and improving configuration efficiency.

Figure 3:
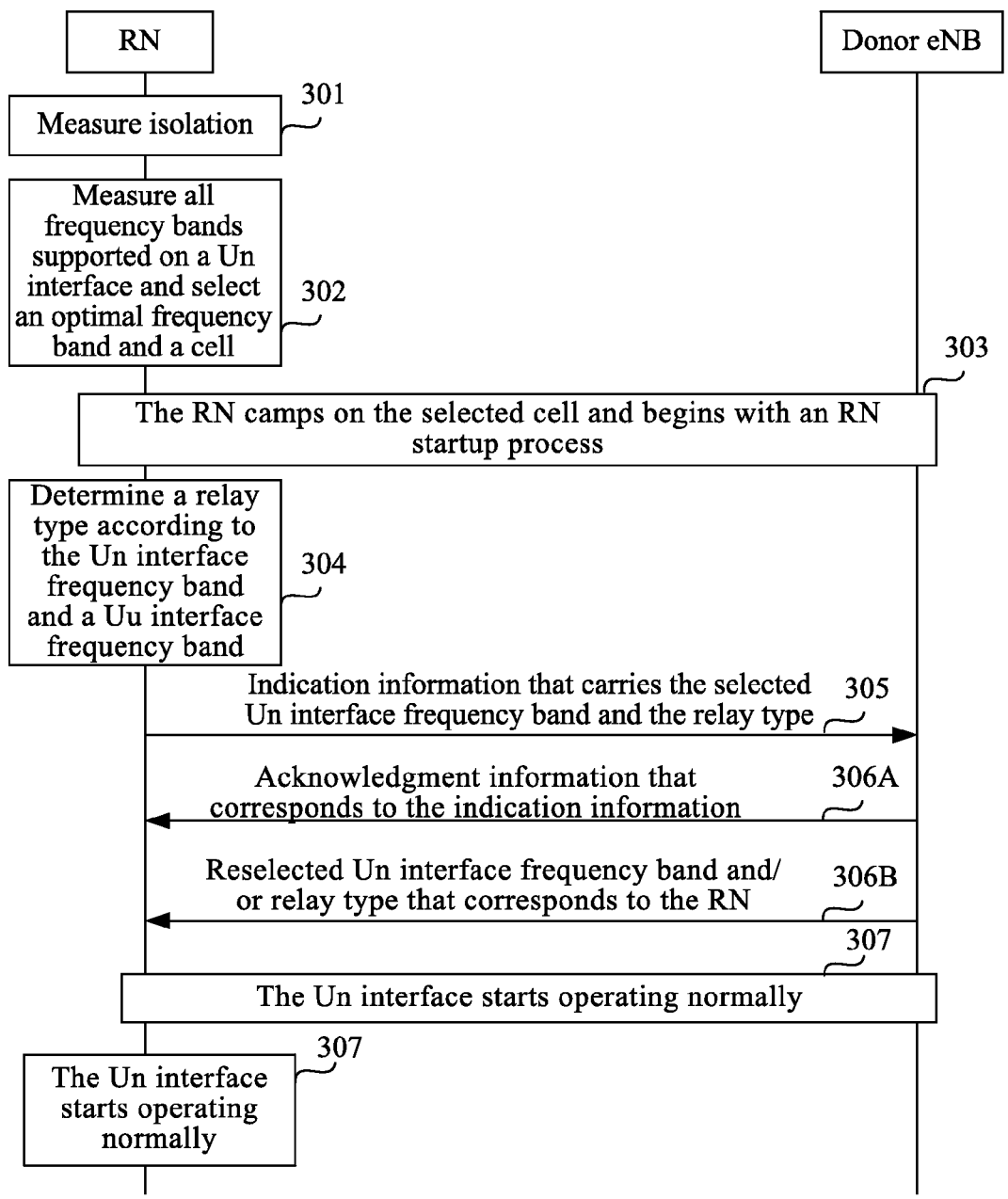
FIG. 3 is a signaling diagram of a third embodiment of the method for selecting a relay type according to the present invention.

FIG. 3 is a signaling diagram of a third embodiment of the method for selecting a relay type according to the present invention. As shown in FIG. 3, selecting a relay type by an RN in a non-connected state is taken as an example for description in this embodiment. The method specifically includes the following steps:

S301. An RN measures isolation between a relay link and an access link that are connected to the RN.

At this time, the RN does not yet initiate an attachment request to a DeNB, and the RN is newly powered on or in an idle (idle) state. Isolation (Isolation) is used to show a degree of interference between a transmit antenna and a receive antenna of the RN.

S302. The RN measures all frequency bands supported on a Un interface one by one, and selects a frequency band with an optimal signal from a measurement result.

The RN measures all radio frequency channels supported on the Un interface according to its own capability to support frequency bands on the Un interface, and selects a Un interface frequency band with strongest RSRP and optimal RSRQ from a measurement result. After selecting the Un interface frequency band, the RN may further select a cell with strongest signals on this Un interface frequency band.

This embodiment gives an exemplary implementation manner for the RN to select a Un interface frequency band. In addition, the RN may not necessarily measure all radio frequency channels supported on the Un interface, but measures only a part of the radio frequency channels and then selects a frequency band with an optimal signal from a measurement result.

S303. The RN camps on the selected cell and begins with an RN startup process.

That is, the RN establishes a connection with the DeNB and enters a connected state.

S304. The RN determines a relay type according to the selected Un interface frequency band and a configured Uu interface frequency band.

This step may specifically include: comparing, by the RN, the Un interface frequency band selected by the RN with the Uu interface frequency band. If the selected Un interface frequency band is the same as the configured Uu interface frequency band, the relay type is in-band relay; or if the selected Un interface frequency band is different from the configured Uu interface frequency band, the relay type is out-of-band relay.

If the relay type is in-band relay, the RN may further determine whether the relay type is in-band full-duplex or in-band half-duplex according to the measured isolation. The isolation can reflect a degree of interference between the transmit antenna and the receive antenna of the RN on a given frequency band. If the isolation exceeds a preset range, it may be considered that the interference between the transmit antenna and the receive antenna of the RN is strong and then the relay type is in-band full-duplex; or if the isolation is within the preset range, the relay type is in-band half-duplex.

S305. The RN sends indication information to the DeNB, where the indication information carries information of the selected Un interface frequency band and the relay type.

Meanwhile, the RN may further send the measurement result about all frequency bands supported on the Un interface and information of the measured isolation to the DeNB, so that the DeNB reconfigures, according to the isolation and the measurement result, Un interface frequency bands for other RNs under the control of the DeNB and/or relay types that correspond to these RNs.

After receiving the indication information sent by the RN, the DeNB may make a reply directly according to the indication information, that is, S306A is executed; or the DeNB may further reselect a Un interface frequency band and/or a relay type that corresponds to the RN for the RN, that is, S306B is executed.

S306A. The DeNB replies with corresponding acknowledgment information to the RN according to the indication information.

After receiving the indication information sent by the RN, the DeNB may directly reply with acknowledgment information to the RN; or the DeNB may make a corresponding reply according to the relay type selected by the RN. If the relay type that the RN selects is out-of-band relay or a full-duplex type of in-band relay, the DeNB may perform corresponding configuration for the relay type and reply with corresponding configuration information to the RN; or if the relay type that the RN selects is a half-duplex type of in-band relay, the DeNB further needs to reallocate resources and then sends reconfiguration information to the RN. In addition, if the relay type that the RN selects is the half-duplex type of in-band relay, the DeNB further sends configuration information of a subframe used in the relay link to the RN.

S306B. The DeNB reselects a Un interface frequency band and/or a relay type that corresponds to the RN for the RN.

Excessive resources may have been distributed on the Un interface frequency band selected by the RN, or the Un interface frequency band selected by the RN may cause severe interference to other RNs. Therefore, the DeNB may reselect, according to system load distribution and a measurement result that the DeNB has collected, about Un interface frequency bands of the RN and other RNs, a Un interface frequency band and/or a relay type that corresponds to the RN for the RN. This may specifically include the following.

In S305, when the RN sends the indication information to the DeNB, the RN may report the measurement result about each of its frequency bands on the Un interface to the DeNB. Therefore, the DeNB may reselect a Un interface frequency band for the RN directly according to the measurement result and system load distribution, and may further select a relay type that corresponds to the RN; or the DeNB selects multiple Un interface frequency bands with strong RSRP and good RSRQ for the RN, and the RN further selects an optimal Un interface frequency band from these Un interface frequency bands and/or determines a relay type that corresponds to the RN.

The DeNB may reselect a Un interface frequency band and/or a relay type that corresponds to the RN for the RN by using the following manners the DeNB may send change information to the relay node, where the change information carries a Un interface frequency band and/or a relay type that corresponds to the RN, which is reselected for the relay node, or the DeNB may send Radio Resource Control Protocol (Radio Resource Control; RRC) signaling to the RN, where the RRC signaling carries a Un interface frequency band reselected for the RN.

It should be noted that the change information may carry both information of the Un interface frequency band reselected for the RN and information of the relay type reselected for the RN; while the RRC signaling can carry only information of the Un interface frequency band reselected for the RN.

Further, the Un interface frequency band that the RN or DeNB selects may cause interference to relevant RNs; therefore, the DeNB may further determine, according to the measurement result sent by the RN and about all frequency bands supported on the Un interface, other RNs that are under the control of the DeNB and may be interfered, so that more appropriate frequency bands and/or relay types that correspond to these RNs are reselected for these RNs, for example, a Un interface frequency band may be changed or a relay type may be changed from in-band full-duplex to in-band half-duplex or from in-band half-duplex to in-band full-duplex. The DeNB implements system resource optimization by reselecting an appropriate Un interface frequency band and/or a relay type that corresponds to the RN for the RN as well as reselecting appropriate frequency bands for other RNs under the control of the DeNB and/or relay types that correspond to these RNs.

S307. After the RN finishes configuration, the Un interface and a Uu interface of the RN start operating normally.

It should be noted that the measurement started by the RN for the isolation between the relay link and the access link that are connected to the RN in S301 may also be performed in a process of determining the relay type in S304. If the RN determines that the relay type is in-band relay, an isolation measurement is further started, and then it is further determined whether the relay type is in-band full-duplex or in-band half-duplex according to a measurement result.

In the method for selecting a relay type according to this embodiment, an RN that does not yet establish a connection with a DeNB may measure all frequency bands supported on a Un interface and select a frequency band with an optimal signal from a measurement result. When receiving indication information that carries the selected Un interface frequency band and a relay type and is sent by the RN, the DeNB may reselect an appropriate Un interface frequency band and/or a relay type that corresponds to the RN for the RN according to system load distribution and the like, so that the relay type is adaptively selected, thereby reducing an operating cost for configuring the RN and improving configuration efficiency.

Figure 4:
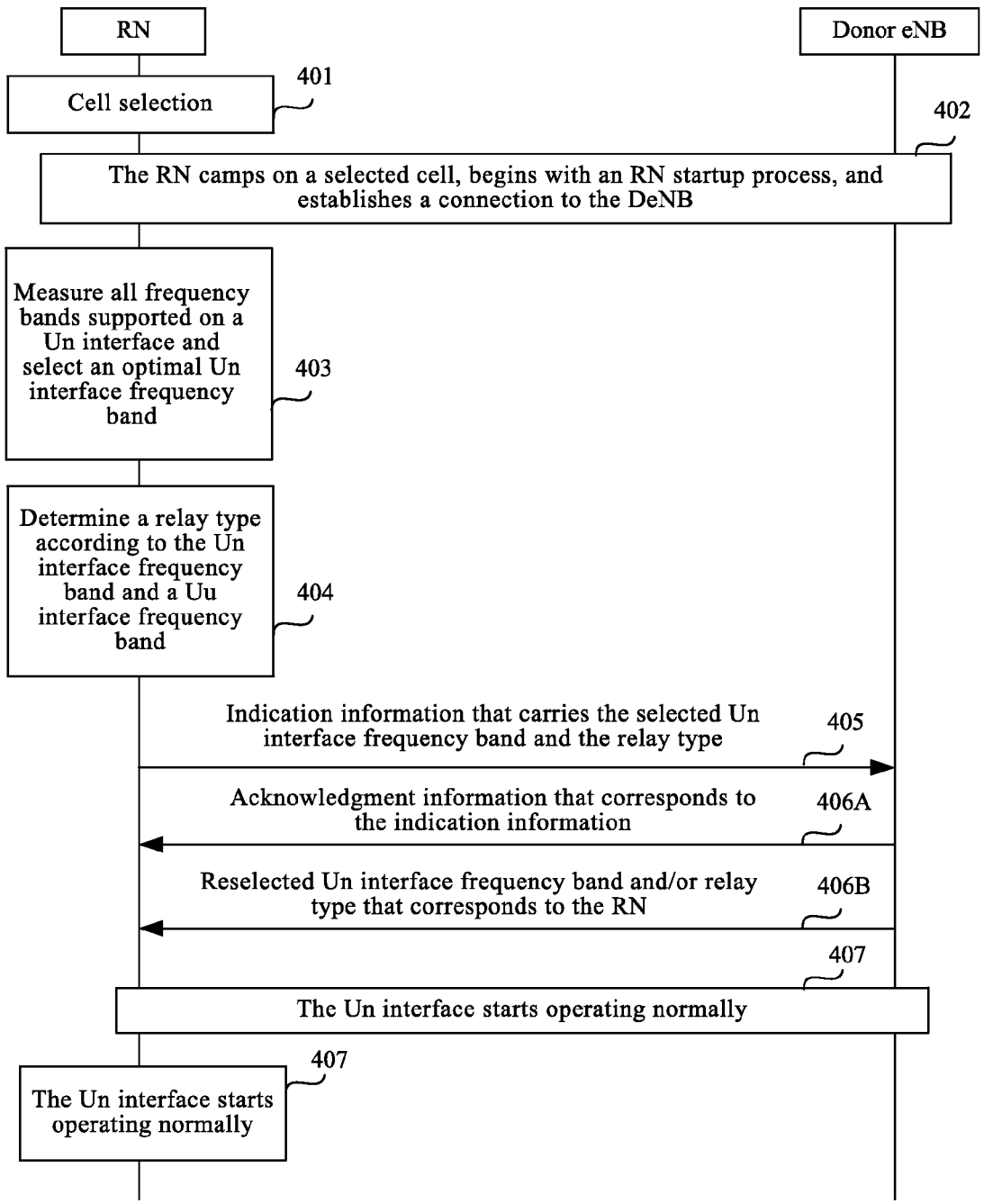
FIG. 4 is a signaling diagram of a fourth embodiment of the method for selecting a relay type according to the present invention.

FIG. 4 is a signaling diagram of a fourth embodiment of the method for selecting a relay type according to the present invention. As shown in FIG. 4, selecting a relay type by an RN in a connected state is taken as an example for description in this embodiment. The method specifically includes the following steps:

S401. An RN executes a cell selection process.

In this process, the RN is newly powered on. The executed process is a traditional cell selection process and generally as follows: The RN measures supported frequency bands on a Un interface starting from a frequency band used when the RN is powered off last time; when a Un interface frequency band with strong RSRP and good RSRQ is found through scanning, the RN further seeks a cell that meets a certain condition and then camps on the cell, where the condition that the cell meets may be a condition specified in an S criterion or the like.

As can be seen, in the traditional cell selection process, the RN stops scanning as long as an appropriate frequency band is found by measuring, and the RN does not need to scan all Un interface frequency bands.

S402. The RN camps on the selected cell, begins with an RN startup process, establishes a connection with a DeNB, and enters a connected state.

S403. The RN measures all frequency bands supported on the Un interface, and selects a Un interface frequency band with an optimal signal from a measurement result.

S404. The RN determines a relay type according to the selected Un interface frequency band and a configured Uu interface frequency band.

Before S403, after S403, or after S404, the RN may start a measurement of isolation between a relay link and an access link that are connected to the RN so as to further determine a type of in-band relay.

S405. The RN sends indication information to the DeNB, where the indication information carries information of the selected Un interface frequency band and the relay type.

Meanwhile, the RN may further send the measurement result about all frequency bands supported on the Un interface and information of the measured isolation to the DeNB, so that the DeNB reconfigures, according to the isolation and the measurement result, Un interface frequency bands for other RNs under the control of the DeNB and/or relay types that correspond to these RNs.

After receiving the indication information sent by the RN, the DeNB may make a reply directly according to the indication information, that is, S406A is executed; or the DeNB may further reselect a Un interface frequency band and/or a relay type that corresponds to the RN for the RN, that is, S406B is executed.

S406A. The DeNB replies with corresponding acknowledgment information to the RN according to the indication information.

S406B. The DeNB reselects a Un interface frequency band and/or a relay type that corresponds to the RN for the RN.

S407. After the RN finishes configuration, the Un interface and a Uu interface of the RN start operating normally.

For S403 to S406B in this embodiment, reference may be made to descriptions of S302 to S306B in the foregoing embodiment. A major difference between this embodiment and the foregoing embodiment is as follows: In the foregoing embodiment, an RN does not yet initiate an attachment request to a DeNB, is newly powered on or in an idle state, and does not establish a connection with the DeNB. In this embodiment, the RN has already established a connection with the DeNB, the RN has completed a process of selecting a Un interface frequency band and a cell, and the RN may reselect, after establishing the connection with the DeNB and entering a connected state, a Un interface frequency band at any time by measuring all frequency bands that the RN supports on a Un interface or using another manner, and then change its own relay type. After receiving the indication information that is sent by the RN and carries the selected Un interface frequency band and the relay type, the DeNB may acknowledge the relay type reselected by the RN, or reconfigure a Un interface frequency band and/or a relay type that corresponds to the RN for the RN according to system load distribution and the like, so that the relay type is adaptively selected, thereby reducing an operating cost for configuring the RN and improving configuration efficiency.

Figure 5:
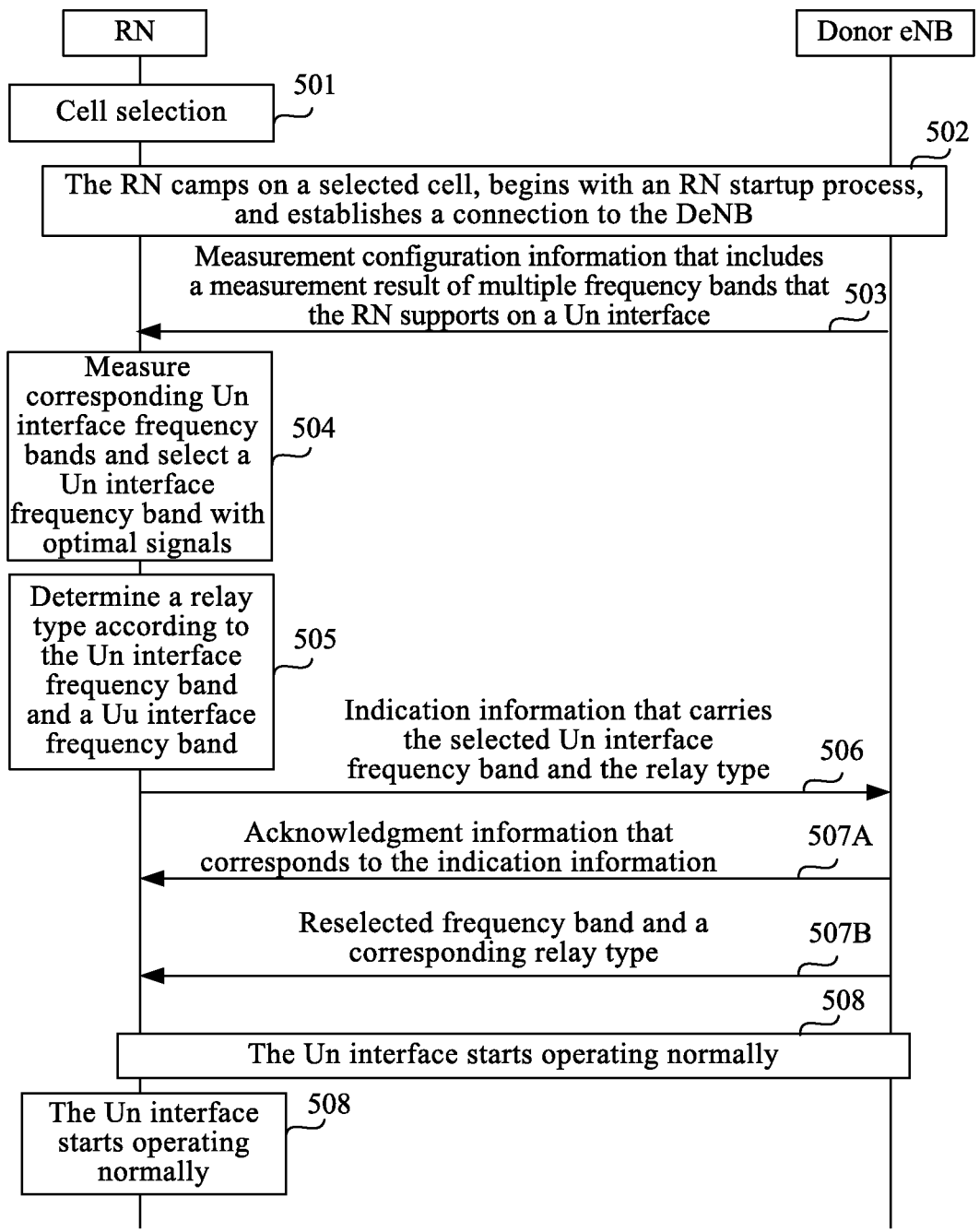
FIG. 5 is a signaling diagram of a fifth embodiment of the method for selecting a relay type according to the present invention.

FIG. 5 is a signaling diagram of a fifth embodiment of the method for selecting a relay type according to the present invention. As shown in FIG. 5, selecting a relay type by an RN in a connected state is still taken as an example for description in this embodiment. A difference from the foregoing embodiment is as follows: In the foregoing embodiment, an RN measures all frequency bands supported on a Un interface and selects a Un interface frequency band with an optimal signal from a measurement result, that is, the RN performs a process of selecting a Un interface frequency band. In this embodiment, a DeNB and an RN may jointly perform the process of selecting a Un interface frequency band. The method specifically includes the following steps:

S501. An RN executes a cell selection process.

S502. The RN camps on a selected cell, begins with an RN startup process, establishes a connection with a DeNB, and enters a connected state.

S503. The DeNB sends measurement configuration information to the RN, where the measurement configuration information includes information of multiple Un interface frequency bands that the DeNB selects after measuring frequency bands that the RN supports on a Un interface.

Specifically, the DeNB may measure multiple frequency bands or all frequency bands that the RN supports on the Un interface in advance according to capability of the RN to support frequency bands on the Un interface, or performs a filtering operation and the like. Meanwhile, the DeNB may also select several Un interface frequency bands with good signals from a measurement result while comprehensively considering a system load and information reported by other RNs or user equipments (UE), and inform the RN through the measurement configuration information.

S504. The RN measures the multiple Un interface frequency bands in the measurement configuration information, and selects a Un interface frequency band with an optimal signal.

The RN measures corresponding Un interface frequency bands according to the measurement configuration information sent by the DeNB, selects a Un interface frequency band with an optimal signal, and further selects a cell with strongest signals on the Un interface frequency band.

S505. The RN determines a relay type according to the selected Un interface frequency band and a configured Uu interface frequency band.

The RN may, after S504 or in a process of S505, start a measurement of isolation between a relay link and an access link that are connected to the RN so as to further determine a type of in-band relay.

S506. The RN sends indication information to the DeNB, where the indication information carries information of the selected Un interface frequency band and the relay type.

After receiving the indication information sent by the RN, the DeNB may make a reply directly according to the indication information, that is, S507A is executed; or the DeNB may further select a Un interface frequency band and/or a relay type that corresponds to the RN for the RN, that is, S507B is executed.

S507A. The DeNB replies with corresponding acknowledgment information to the RN according to the indication information.

S507B. The DeNB reselects a Un interface frequency band and/or a relay type that corresponds to the RN for the RN.

S508. After the RN finishes configuration, the Un interface and a Uu interface of the RN start operating normally.

In both this embodiment and the foregoing embodiment, a relay type is selected when an RN has established a connection with a DeNB. A major difference is as follows: In the foregoing embodiment, the RN reselects a Un interface frequency band by measuring all frequency bands that the RN supports on a Un interface and then changes its own relay type. In this embodiment, however, because the RN and the DeNB have already entered a connected state, the DeNB is capable of measuring frequency bands that the RN supports on the Un interface. Therefore, the DeNB may select several Un interface frequency bands with good signal quality for the RN in advance and inform the RN; and the RN further measures the Un interface frequency bands that the DeNB has selected to determine a frequency band with an optimal signal.

After receiving the indication information that is sent by the RN and carries the selected Un interface frequency band and the relay type, the DeNB may acknowledge the Un interface frequency band and the relay type that are reselected by the RN, or reconfigure a Un interface frequency band and/or a relay type that corresponds to the RN for the RN according to system load distribution and the like, so that the relay type is adaptively selected, thereby reducing an operating cost for configuring the RN and improving configuration efficiency.

Persons of ordinary skill in the art should understand that all or part of the steps of the method embodiments may be implemented by a program instructing relevant hardware. The program may be stored in a computer readable storage medium. When the program is run, the steps of the methods in the method embodiments are performed. The storage medium may be any medium capable of storing program codes, such as ROM, RAM, a magnetic disk, or an optical disk.

Figure 6:
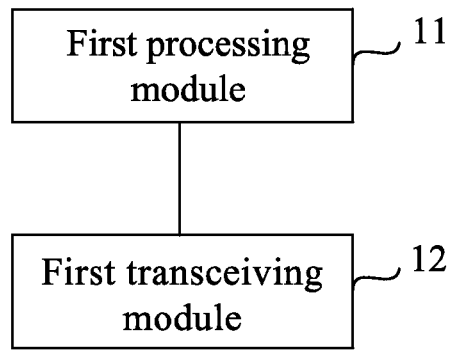
FIG. 6 is a schematic structural diagram of a first embodiment of a relay node according to the present invention.

FIG. 6 is a schematic structural diagram of a first embodiment of a relay node according to the present invention. As shown in FIG. 6, the relay node includes a first processing module 11 and a first transceiving module 12, where the first processing module 11 is configured to select a Un interface frequency band with an optimal signal according to frequency bands supported on a Un interface; and determine a relay type according to the selected Un interface frequency band and a configured Uu interface frequency band, and the first transceiving module 12 is configured to send indication information to a DeNB, where the indication information includes the Un interface frequency band selected by the first processing module 11 and the relay type determined by the first processing module 11.

The RN provided in this embodiment may select a relay type before establishing a connection with the DeNB, that is, when the RN is in an idle (idle) state; or the RN may select the relay type after establishing the connection with the DeNB.

The first processing module 11 in the RN selects a Un interface frequency band with an optimal signal according to frequency bands supported on the Un interface, where the Un interface frequency band with the optimal signal is an optimal frequency band supported on the Un interface. A frequency band supported on the Un interface is simply called a Un interface frequency band. The selecting, by the first processing module 11, a Un interface frequency band with an optimal signal may be specifically as follows: measuring frequency bands that the RN supports on the Un interface, which mainly includes measuring RSRP and RSRQ of each of the frequency bands, and selecting a frequency band with optimal RSRP and RSRQ from a measurement result. The first processing module 11 may measure all frequency bands supported on the Un interface, and select a Un interface frequency band with an optimal signal; or measure several frequency bands supported on the Un interface, and then select a frequency band with an optimal signal from these frequency bands; or measure several frequency bands starting from a frequency band used when the RN is powered off last time, and then select a frequency band with an optimal signal from these frequency bands. As can be seen, multiple manners may be available for the first processing module 11 to select an optimal Un interface frequency band and are not described one by one herein.

After selecting a frequency band with optimal signal quality, the first processing module 11 may further select a cell with strongest signals on this Un interface frequency band and camp on (camps on) the selected cell to begin with an RN startup process.

Further, after selecting the Un interface frequency band, the first processing module 11 may determine a relay type according to the selected Un interface frequency band and the configured Uu interface frequency band, where the Uu interface frequency band is a frequency band supported on a Uu interface. The determining a relay type mainly depends on the Un interface frequency band and the Uu interface frequency band, where the Uu interface frequency band is configured in advance. This specifically includes the following: If the Un interface frequency band is different from the Uu interface frequency band, the relay type is out-of-band relay; or if the Un interface frequency band is the same as the Uu interface frequency band, the relay type is in-band relay. In-band relay is further classified into in-band half-duplex and in-band full-duplex. This mainly depends on isolation between a relay link and an access link. Therefore, the RN may further determine a type of in-band relay by starting a measurement of the isolation between the relay link and the access link.

After the relay type is determined, the first transceiving module 12 sends indication information to the DeNB, where the indication information includes the selected Un interface frequency band and the relay type.

After receiving the indication information sent by the RN, the DeNB may make a corresponding reply according to the relay type selected by the RN, or reselect a more appropriate Un interface frequency band and/or a relay type that corresponds to the RN for the RN.

The relay node provided in this embodiment selects a frequency band with an optimal signal according to frequency bands supported on a Un interface, and then determines a relay type, so that the relay type is adaptively selected according to quality and an interference condition of each of the frequency bands supported on the Un interface, thereby reducing an operating cost for configuring the RN and improving configuration efficiency.

The relay node provided in this embodiment may be configured to execute a method for selecting a relay type according to the foregoing method embodiments. For specific implementation, reference may be made to the foregoing method embodiments and details are not repeated herein.

Figure 7:
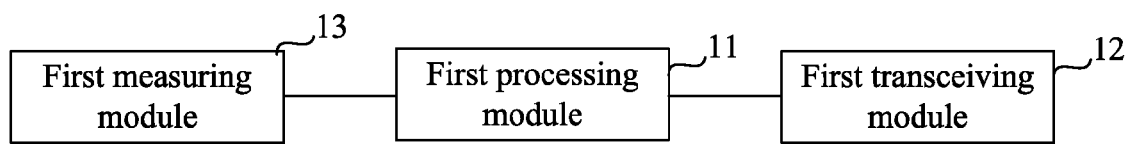
FIG. 7 is a schematic structural diagram of a second embodiment of the relay node according to the present invention.

FIG. 7 is a schematic structural diagram of a second embodiment of the relay node according to the present invention. As shown in FIG. 7, based on the foregoing embodiment, the relay node further includes a first measuring module 13, configured to measure the isolation between the relay link and the access link that are connected to the RN.

The first processing module 11 may be configured to further determine, after the relay type is determined as in-band relay according to the selected Un interface frequency band and the configured Uu interface frequency band, whether the relay type is in-band full-duplex or in-band half-duplex of the in-band relay type according to the isolation measured by the first measuring module 13.

The first processing module 11 may be specifically configured to measure all frequency bands supported on the Un interface, and select a Un interface frequency band with an optimal signal from a measurement result.

Further, the indication information sent by the first transceiving module 12 to the DeNB may further include the isolation measured by the first measuring module 13 and a result of a measurement performed by the relay node for all frequency bands supported on the Un interface, so that the DeNB reconfigures, according to the isolation and the measurement result, Un interface frequency bands for other relay nodes under the control of the DeNB and/or relay types that correspond to these relay nodes.

Further, the first transceiving module 12 is further configured to receive measurement configuration information sent by the DeNB, where the measurement configuration information includes information of multiple Un interface frequency bands selected after the DeNB measures frequency bands that the RN supports on the Un interface.

The first processing module 11 may be further configured to measure the multiple Un interface frequency bands in the measurement configuration information received by the first transceiving module 12, and select a Un interface frequency band with an optimal signal.

The Un interface frequency band with the optimal signal may be selected by the RN as follows: The first processing module 11 in the RN measures all frequency bands supported on the Un interface, and selects a Un interface frequency band with an optimal signal from a measurement result; or the RN and the DeNB cooperate with each other to select a Un interface frequency band: The DeNB may measure multiple frequency bands or all frequency bands that the RN supports on the Un interface in advance according to capability of the RN to support frequency bands on the Un interface, or performs a filtering operation and the like. Meanwhile, the DeNB may select several Un interface frequency bands with good signals from a measurement result while comprehensively considering a system load and information reported by other RNs or UEs, and inform the RN through the measurement configuration information. After the first transceiving module 12 in the RN receives the measurement configuration information sent by the DeNB, the first processing module 11 measures the multiple Un interface frequency bands in the measurement configuration information received by the first transceiving module 12, and selects a Un interface frequency band with an optimal signal.

After selecting the Un interface frequency band, the first processing module 11 may determine a relay type according to the selected Un interface frequency band and the configured Uu interface frequency band, and send indication information to the DeNB through the first transceiving module 12, where the indication information includes the Un interface frequency band selected by the first processing module 11 and the relay type.

A specific process of determining, by the first processing module 11, a relay type includes: comparing the Uu interface frequency band with the selected Un interface frequency band; and if the selected Un interface frequency band is the same as the configured Uu interface frequency band, the relay type is in-band relay; or if the selected Un interface frequency band is different from the configured Uu interface frequency band, determining that the relay type is out-of-band relay.

Further, if the relay type is in-band relay, the RN further starts a measurement of the isolation between the relay link and the access link through the first measuring module 13, and further determines whether the relay type is in-band full-duplex or in-band half-duplex according to the isolation. The isolation can reflect a degree of interference between a transmit antenna and a receive antenna of the RN on the selected frequency band. If the isolation exceeds a preset range, it may be considered that the interference between the transmit antenna and the receive antenna of the RN is strong and then the relay type is in-band full-duplex; or if the isolation is within the preset range, the relay type is in-band half-duplex.

After the relay type is determined, the first transceiving module 12 sends indication information that carries the selected Un interface frequency band and the relay type to the DeNB. In addition, the indication information sent by the first transceiving module 12 to the DeNB may further include the isolation measured by the first measuring module 13 and the result of the measurement performed by the first processing module 11 for all frequency bands supported on the Un interface, so that the DeNB reconfigures, according to the isolation and the measurement result, Un interface frequency bands for other relay nodes under the control of the DeNB and/or relay types that correspond to these relay nodes.

After receiving the indication information sent by the RN, the DeNB may make a corresponding reply according to the relay type selected by the RN, or reselect a more appropriate Un interface frequency band and/or a relay type that corresponds to the RN for the RN.

The relay node provided in this embodiment selects a frequency band with an optimal signal according to frequency bands supported on a Un interface, and then determines a relay type, so that the relay type is adaptively selected according to quality and an interference condition of each of the frequency bands supported on the Un interface, thereby reducing an operating cost for configuring the RN and improving configuration efficiency.

The relay node provided in this embodiment may be configured to execute a method for selecting a relay type according to the foregoing method embodiments. For specific implementation, reference may be made to the foregoing method embodiments and details are not repeated herein.

Figure 8:
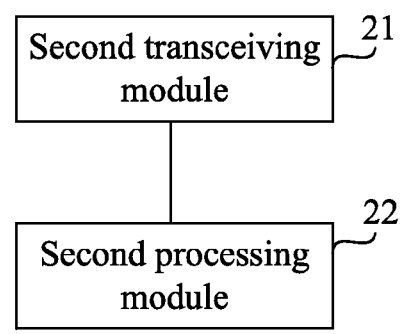
FIG. 8 is a schematic structural diagram of a first embodiment of a DeNB according to the present invention.

FIG. 8 is a schematic structural diagram of a first embodiment of a DeNB according to the present invention. As shown in FIG. 8, the DeNB includes a second transceiving module 21 and a second processing module 22, where the second transceiving module 21 is configured to receive indication information sent by a relay node, where the indication information includes a Un interface frequency band selected by the relay node and a relay type determined by the relay node, and the second processing module 22 is configured to reselect, according to the indication information received by the second transceiving module 21, a Un interface frequency band and/or a relay type that corresponds to the relay node for the relay node.

Specifically, the RN may select a relay type before establishing a connection with the DeNB, that is, when the RN is in an idle (idle) state; or the RN may select the relay type after establishing the connection with the DeNB.

Multiple selection manners may specifically be available for the RN to select a Un interface frequency band with an optimal signal according to frequency bands supported on a Un interface. For example, the RN may measure all frequency bands supported on the Un interface, and select a frequency band with an optimal signal; or the RN measures several frequency bands supported on the Un interface, and then selects a frequency band with an optimal signal from these frequency bands; or the RN measures several frequency bands starting from a frequency band used when the RN is powered off last time, and then selects a frequency band with an optimal signal from these frequency bands.

After selecting the Un interface frequency band, the RN may further select a cell with strongest signals on this Un interface frequency band and camp on the selected cell to begin with an RN startup process.

Further, the RN determines a relay type according to the selected Un interface frequency band and a configured Uu interface frequency band, and sends indication information that carries information of the relay type to the DeNB.

After the second transceiving module 21 in the DeNB receives the indication information sent by the RN, the second processing module 22 may directly reply with acknowledgment information to the RN; or the second processing module 22 may make a corresponding reply according to the relay type selected by the RN. Specifically, if the relay type that the RN selects is out-of-band relay or a full-duplex type of in-band relay, the second processing module 22 may perform corresponding configuration for the relay type and reply with corresponding configuration information to the RN; or if the relay type that the RN selects is a half-duplex type of in-band relay, the second processing module 22 further needs to reallocate resources and then sends reconfiguration information to the RN. In addition, if the relay type that the RN selects is the half-duplex type of in-band relay, the second processing module 22 further sends configuration information of a subframe used in a relay link to the RN.

The second processing module 22 may reconfigure a Un interface frequency band and/or a relay type that corresponds to the RN for the RN according to system load distribution or certain measurement information that the DeNB has collected, such as information of each frequency band that the RN supports on the Un interface or an impact of other RNs on each Un interface frequency band. This may be specifically as follows: The second processing module 22 directly selects a Un interface frequency band with strongest RSRP and optimal RSRQ for the RN according to the collected information of each frequency band. Since the RN may have already reported its Uu interface frequency band to the DeNB, the second processing module 22 may directly reselect a Un interface frequency band for the RN, and/or re-determine a relay type for the RN; or the second processing module 22 may also send the selected Un interface frequency band to the RN, so that the RN further determines a relay type according to the Uu interface frequency band. Alternatively, the second processing module 22 selects multiple Un interface frequency bands with good signal quality and little interference for the RN, and then the RN further selects an optimal frequency band from these frequency bands and determines a corresponding relay type.

As can be seen, the second processing module 22 may use multiple manners, which are not described one by one herein, to reselect a Un interface frequency band and/or a relay type that corresponds to the RN for the RN.

The DeNB provided in this embodiment may reconfigure a Un interface frequency band and/or a relay type that corresponds to an RN for the RN according to sent indication information that includes the relay type, so that the relay type is adaptively selected according to quality and an interference condition of each frequency band supported on a Un interface, thereby reducing an operating cost for configuring the RN and improving configuration efficiency.

The DeNB provided in this embodiment may be configured to execute a method for selecting a relay type according to the foregoing method embodiments. For specific implementation, reference may be made to the foregoing method embodiments and details are not repeated herein.

Figure 9:
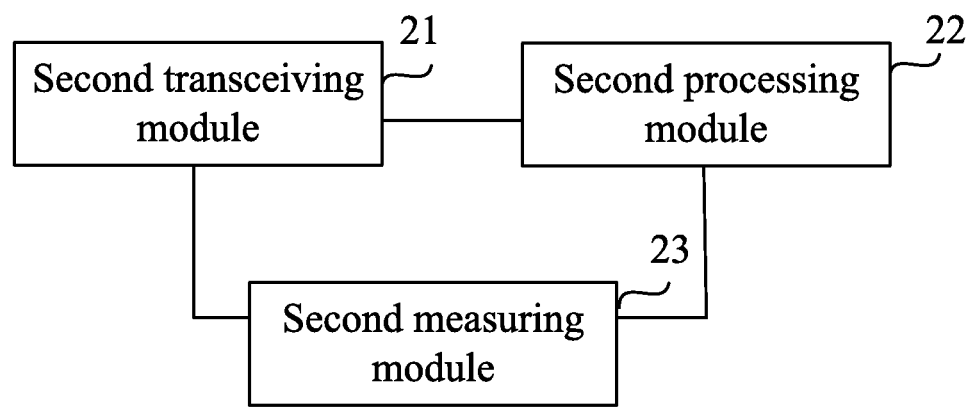
FIG. 9 is a schematic structural diagram of a second embodiment of the DeNB according to the present invention.

FIG. 9 is a schematic structural diagram of a second embodiment of the DeNB according to the present invention. As shown in FIG. 9, based on the foregoing embodiment, the DeNB may further include a second measuring module 23, configured to measure frequency bands that the relay node supports on the Un interface, and select multiple Un interface frequency bands.

The second transceiving module 21 is further configured to send measurement configuration information to the relay node, where the measurement configuration information includes information of the multiple Un interface frequency bands selected by the second measuring module 23, so that the relay node selects the Un interface frequency band included in the indication information according to the multiple Un interface frequency bands and determines the relay type included in the indication information according to the selected Un interface frequency band.

The second processing module 22 may be specifically configured to send change information to the relay node, where the change information includes a Un interface frequency band and/or a relay type that corresponds to the RN, which is reselected for the relay node; or send radio resource control RRC signaling to the relay node, where the RRC signaling carries a Un interface frequency band reselected for the relay node.

In addition, the indication information received by the second transceiving module 21 further includes a result of a measurement performed by the relay node for all frequency bands supported on the Un interface and isolation between a relay link and an access link, where the isolation is measured by the relay node.

Further, the second processing module 22 is further configured to reconfigure, according to the information of the Un interface frequency band selected by the relay node, the measurement result, and the isolation, Un interface bands for other controlled relay nodes and/or relay types that correspond to these relay nodes.

The Un interface frequency band with the optimal signal may be selected by the RN, or the RN and the DeNB cooperate with each other to select a Un interface frequency band, which is specifically as follows: The second measuring module 23 in the DeNB may measure multiple frequency bands or all frequency bands that the RN supports on the Un interface in advance according to capability of the RN to support frequency bands on the Un interface, or performs a filtering operation and the like. Meanwhile, the second measuring module 23 may select several Un interface frequency bands with good signals from a result of the measurement while comprehensively considering a system load and information reported by other RNs or UEs, and the second transceiving module 21 sends the measurement configuration information to the RN. After the RN receives the measurement configuration information sent by the second transceiving module 21, the RN measures the multiple Un interface frequency bands in the received measurement configuration information, and selects a Un interface frequency band with an optimal signal.

After selecting a Un interface frequency band, the RN determines a relay type according to the selected Un interface frequency band and the configured Uu interface frequency band, and sends indication information to the DeNB, where the indication information includes the selected Un interface frequency band and the relay type.

After the second transceiving module 21 in the DeNB receives the indication information, the second processing module 22 may directly reply with acknowledgment information to the RN; or makes a corresponding reply according to the relay type selected by the RN. Alternatively, the second processing module 22 sends change information to the relay node, where the change information includes a Un interface frequency band and/or a relay type that corresponds to the RN, which is reselected for the relay node; or sends radio resource control RRC signaling to the relay node, where the RRC signaling includes a Un interface frequency band reselected for the relay node. Through the foregoing operations, the DeNB can reselect a Un interface frequency band and/or a relay type that corresponds to the relay node for the relay node.

In addition, the Un interface frequency band that the RN or DeNB selects may cause interference to relevant RNs; therefore, the second processing module 22 may further determine, according to a measurement result sent by the RN about all frequency bands supported on the Un interface, other RNs that are under the control of the DeNB and may be interfered, so that the second processing module 22 reconfigures, according to the information of the Un interface frequency band selected by the relay node, the measurement result, and the isolation, Un interface bands for the other controlled relay nodes and/or relay types that correspond to these relay nodes.

The DeNB provided in this embodiment may switch a relay type determined by an RN, so that the relay type is adaptively selected according to quality and an interference condition of each frequency band supported on a Un interface, thereby reducing an operating cost for configuring the RN and improving configuration efficiency.

The DeNB provided in this embodiment may be configured to execute a method for selecting a relay type according to the foregoing method embodiments. For specific implementation, reference may be made to the foregoing method embodiments and details are not repeated herein.

Figure 10:
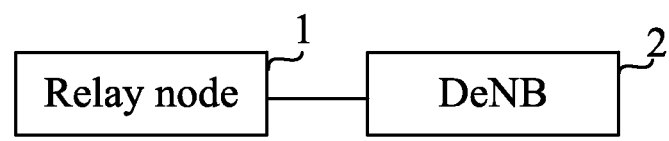
FIG. 10 is a schematic structural diagram of a first embodiment of a system for selecting a relay type according to the present invention.

FIG. 10 is a schematic structural diagram of a first embodiment of a system for selecting a relay type according to the present invention. As shown in FIG. 10, the system includes a relay node 1 and a DeNB 2, where the relay node 1 is configured to select a Un interface frequency band with an optimal signal according to frequency bands supported on a Un interface; determine a relay type according to the selected Un interface frequency band and a configured Uu interface frequency band; and send indication information to the DeNB 2, where the indication information includes information of the selected Un interface frequency band and the relay type, and the DeNB 2 is configured to receive the indication information sent by the relay node 1; and reselect, according to the indication information, a Un interface frequency band and/or a relay type that corresponds to the relay node 1 for the relay node 1.

In the system for selecting a relay type according to this embodiment, the relay node 1 may select a relay type before establishing a connection with the DeNB 2, that is, when the relay node 1 is in an idle (idle) state; or the relay node 1 may select the relay type after establishing the connection with the DeNB 2.

The relay node 1 selects a Un interface frequency band with an optimal signal according to frequency bands supported on the Un interface, where the Un interface frequency band with the optimal signal is an optimal frequency band supported on the Un interface. In descriptions of the embodiments of the present invention, a frequency band supported on the Un interface is simply called a Un interface frequency band. The selecting, by the relay node 1, a Un interface frequency band with an optimal signal may be specifically as follows: measuring, by the relay node 1, frequency bands that the relay node 1 supports on the Un interface, which mainly includes measuring RSRP and RSRQ of each of the frequency bands, and selecting a frequency band with optimal RSRP and RSRQ from a measurement result. The relay node 1 may measure all frequency bands supported on the Un interface, and select a Un interface frequency band with an optimal signal; or the relay node 1 may measure several frequency bands supported on the Un interface, and then select a frequency band with an optimal signal from these frequency bands; or the relay node 1 may also measure several frequency bands starting from a frequency band used when the relay node 1 is powered off last time, and then select a frequency band with an optimal signal from these frequency bands. As can be seen, multiple manners are available for selecting an optimal Un interface frequency band and are not described one by one herein.

After selecting a frequency band with optimal signal quality, the relay node 1 may further select a cell with strongest signals on this Un interface frequency band and camp on (camps on) the selected cell to begin with a relay node 1 startup process.

Further, after selecting a Un interface frequency band, the relay node 1 determines a relay type according to the selected Un interface frequency band and the configured Uu interface frequency band, where the Uu interface frequency band is a frequency band supported on a Uu interface. In following descriptions, a frequency band supported on the Uu interface is simply called a Uu interface frequency band. The determining a relay type mainly depends on the Un interface frequency band and the Uu interface frequency band, where the Uu interface frequency band is configured in advance. This specifically includes the following: If the Un interface frequency band is different from the Uu interface frequency band, that is, a relay link and an access link operate on different carriers, the relay type is out-of-band relay; or if the Un interface frequency band is the same as the Uu interface frequency band, the relay type is in-band relay. In-band relay is further classified into in-band half-duplex and in-band full-duplex. This mainly depends on isolation between the relay link and the access link, that is, a degree of interference between the relay link and the access link. Therefore, the relay node 1 may further determine a type of in-band relay by starting a measurement of the isolation between the relay link and the access link.

After determining the relay type, the relay node 1 sends indication information to the DeNB 2, where the indication information includes the Un interface frequency band selected by the relay node 1 and the relay type determined by the relay node 1.

After receiving the indication information sent by the relay node 1, the DeNB 2 may directly reply with acknowledgment information to the relay node 1; or the DeNB 2 may make a corresponding reply according to the relay type selected by the relay node 1. Specifically, if the relay type that the relay node 1 selects is out-of-band relay or a full-duplex type of in-band relay, the DeNB 2 may perform corresponding configuration for the relay type and reply with corresponding configuration information to the relay node 1; or if the relay type that the relay node 1 selects is a half-duplex type of in-band relay, the DeNB 2 further needs to reallocate resources and then sends reconfiguration information to the relay node 1. In addition, if the relay type that the relay node 1 selects is the half-duplex type of in-band relay, the DeNB 2 further sends configuration information of a subframe used in the relay link to the relay node 1.

The DeNB 2 may reconfigure a Un interface frequency band and/or a relay type that corresponds to the relay node 1 for the relay node 1 according to system load distribution or certain measurement information that the DeNB 2 has collected, such as information of each frequency band that the relay node 1 supports on the Un interface or an impact of other relay nodes 1 on each Un interface frequency band. This may be specifically as follows: The DeNB 2 directly selects a Un interface frequency band with strongest RSRP and optimal RSRQ for the relay node 1 according to the collected information of each frequency band. Since the relay node 1 may have already reported its Uu interface frequency band to the DeNB 2, the DeNB 2 may directly reselect a Un interface frequency band for the relay node 1, and/or re-determine a relay type for the relay node 1; or the DeNB 2 may also send the selected Un interface frequency band to the relay node 1, so that the relay node 1 further determines a relay type according to the Uu interface frequency band. Alternatively, the DeNB 2 selects multiple Un interface frequency bands with good signal quality and little interference for the relay node 1, and then the relay node 1 further selects an optimal frequency band from these frequency bands and determines a corresponding relay type.

As can be seen, the DeNB 2 may use multiple manners, which are not described one by one herein, to reselect a Un interface frequency band and/or a relay type that corresponds to the relay node 1 for the relay node 1.

In the system for selecting a relay type according to this embodiment of the present invention, an RN selects a frequency band with an optimal signal according to frequency bands supported on a Un interface and then determines a relay type; and a DeNB may switch the relay type determined by the RN, so that the relay type is adaptively selected according to quality and an interference condition of each of the frequency bands supported on the Un interface, thereby reducing an operating cost for configuring the RN and improving configuration efficiency.

The system for selecting a relay type according to this embodiment corresponds to the method for selecting a relay type according to the embodiments of the present invention, and is a system for implementing the method for selecting a relay type. For a detailed description of the system, reference may be made to the embodiments of the method for selecting a relay type according to the present invention.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof; without departing from the spirit and scope of the technical solution of the embodiments of the present invention.

What is claimed is:

1. A method for selecting a relay type, the method comprising:
   selecting, by a relay node, a Un interface frequency band with a signal according to frequency bands supported on a Un interface;
   determining, by the relay node, a relay type according to the selected Un interface frequency band and a configured Uu interface frequency band; and
   sending indication information to a DeNB, wherein the indication information comprises the selected Un interface frequency band and the relay type.

2. The method according to claim 1, wherein the method further comprises measuring, by the relay node, isolation between a relay link and an access link that are connected to the relay node; and
   wherein determining the relay type comprises:
   determining, by the relay node, that the relay type is an in-band relay according to the selected Un interface frequency band and the configured Uu interface frequency band; and
   determining whether the relay type is in-band full-duplex or in-band half-duplex of the in-band relay type according to the isolation.

3. The method according to claim 2, wherein selecting the Un interface frequency band comprises measuring all frequency bands supported on the Un interface and selecting the frequency band with an optimal signal from a result of the measuring.

4. The method according to claim 3, wherein the indication information further comprises the isolation and the result of the measuring performed by the relay node for all frequency bands supported on the Un interface, so that the DeNB reconfigures, according to the isolation and the result of the measuring, Un interface frequency bands for other relay nodes under control of the DeNB and/or relay types that correspond to the relay nodes.

5. The method according to claim 2, wherein before selecting the Un interface frequency band the method further comprises receiving, by the relay node, measurement configuration information sent by the DeNB, wherein the measurement configuration information comprises information of multiple Un interface frequency bands selected after the DeNB measures frequency bands supported on the Un interface; and
   wherein selecting the Un interface frequency band comprises measuring, by the relay node, the multiple Un interface frequency bands in the measurement configuration information and selecting the Un interface frequency band with an optimal signal.

6. A method for selecting a relay type, the method comprising:
   receiving, by a DeNB, indication information sent by a relay node, wherein the indication information comprises a Un interface frequency band selected by the relay node and a relay type determined by the relay node; and
   reselecting, by the DeNB, according to the indication information, a Un interface frequency band and a relay type that corresponds to the relay node for the relay node.

7. The method according to claim 6, before the indication information sent by the relay node, the method further comprises:
   measuring, by the DeNB, frequency bands that the relay node supports on the Un interface and selecting multiple Un interface frequency bands; and
   sending, by the DeNB, measurement configuration information to the relay node, wherein the measurement configuration information comprises information of the multiple Un interface frequency bands, so that the relay node selects the Un interface frequency band comprised in the indication information according to the multiple Un interface frequency bands and determines the relay type comprised in the indication information according to the selected Un interface frequency band.

8. The method according to claim 6, wherein reselecting the Un interface frequency band and/or the relay type that corresponds to the relay node for the relay node comprises:
   sending, by the DeNB, change information to the relay node, wherein the change information comprises the Un interface frequency band and/or the relay type that corresponds to reselected for the relay node.

9. The method according to claim 6, wherein reselecting the Un interface frequency band and/or the relay type that corresponds to the relay node for the relay node comprises:

sending, by the DeNB, radio resource control RRC signaling to the relay node, wherein the RRC signaling comprises the Un interface frequency band reselected for the relay node.

10. The method according to claim 6, wherein the indication information further comprises a result of a measurement performed by the relay node for all frequency bands supported on the Un interface and isolation between a relay link and an access link and the isolation is measured by the relay node; and wherein the method further comprises reconfiguring, by the DeNB, according to the information of the Un interface frequency band selected by the relay node, the measurement result, and the isolation, Un interface bands for other controlled relay nodes and/or relay types that correspond to the relay nodes.

11. A relay node, comprising:
a first processing module, configured to select a Un interface frequency band with an optimal signal according to frequency bands supported on a Un interface and to determine a relay type according to the selected Un interface frequency band and a configured Uu interface frequency band; and
a first transceiving module, configured to send indication information to a DeNB, wherein the indication information comprises the Un interface frequency band selected by the first processing module and the relay type determined by the first processing module.

12. The relay node according to claim 11, wherein the relay node further comprises a first measuring module, configured to measure isolation between a relay link and an access link that are connected to the relay node; and wherein the first processing module is further configured to determine, after the relay type is determined as an in-band relay type according to the selected Un interface frequency band and the configured Uu interface frequency band, whether the relay type is in-band full-duplex or in-band half-duplex of the in-band relay type according to the isolation measured by the first measuring module.

13. The relay node according to claim 12, wherein the first processing module is configured to measure all frequency bands supported on the Un interface and to select the Un interface frequency band with the optimal signal from a measurement result.

14. The relay node according to claim 13, wherein the indication information sent by the first transceiving module to the DeNB further comprises the isolation measured by the first measuring module and a result of a measurement performed by the relay node for all frequency bands supported on the Un interface, so that the DeNB reconfigures, according to the isolation and the measurement result, Un interface frequency bands for other relay nodes under the control of the DeNB and/or relay types that correspond to the relay nodes.

15. The relay node according to claim 12, wherein:
the first transceiving module is further configured to receive measurement configuration information sent by the DeNB, wherein the measurement configuration information comprises information of multiple Un interface frequency bands selected after the DeNB measures frequency bands supported on the Un interface; and
the first processing module is further configured to measure the multiple Un interface frequency bands in the measurement configuration information received by the first transceiving module, and select the Un interface frequency band with the optimal signal.

16. A DeNB, comprising:
a transceiving module, configured to receive indication information sent by a relay node, wherein the indication information comprises a Un interface frequency band selected by the relay node and a relay type determined by the relay node; and
a processing module, configured to reselected, according to the indication information received by the transceiving module, a Un interface frequency band and a relay type that corresponds to the relay node for the relay node.

17. The DeNB according to claim 16, further comprising a measuring module, configured to measure frequency bands that the relay node supports on the Un interface, and select multiple Un interface frequency bands;

wherein the transceiving module is further configured to send measurement configuration information to the relay node, wherein the measurement configuration information comprises information of the multiple Un interface frequency bands selected by the measuring module, so that the relay node selects the Un interface frequency band comprised in the indication information according to the multiple Un interface frequency bands and determines the relay type comprised in the indication information according to the selected Un interface frequency band.

18. The DeNB according to claim 16, wherein the processing module is configured to:
send change information to the relay node, wherein the change information comprises a Un interface frequency band and/or a relay type that corresponds to the relay node, which is reselected for the relay node; or
send radio resource control (RRC) signaling to the relay node, wherein the RRC signaling comprises a Un interface frequency band reselected for the relay node.

19. The DeNB according to claim 16, wherein the indication information received by the transceiving module further comprises a result of a measurement performed by the relay node for all frequency bands supported on the Un interface and isolation between a relay link and an access link, and the isolation is measured by the relay node, wherein the processing module is further configured to reconfigure, according to the information of the Un interface frequency band selected by the relay node, the measurement result, and the isolation, Un interface bands for other controlled relay nodes and/or relay types that correspond to the relay nodes.

20. A system for selecting a relay type, comprising: a relay node; and
a DeNB;
wherein the relay node is configured to select a Un interface frequency band with an optimal signal according to frequency bands supported on a Un interface, to determine a relay type according to the selected Un interface frequency band and a configured Un interface frequency band, and to send indication information to the DeNB, wherein the indication information comprises information of the selected Un interface frequency band and the relay type; and
wherein the DeNB is configured to receive the indication information sent by the relay node and to reselect, according to the indication information, a Un interface frequency band and a relay type that corresponds to the relay node for the relay node.

* * * * *

UNITED STATES PATENT AND TRADEMARK OFFICE
CERTIFICATE OF CORRECTION

| | |
|---|---|
| PATENT NO. | : 9,167,500 B2 |
| APPLICATION NO. | : 13/887124 |
| DATED | : October 20, 2015 |
| INVENTOR(S) | : Lu et al. |

It is certified that error appears in the above-identified patent and that said Letters Patent is hereby corrected as shown below:

In the Claims

In Col. 22, line 7, claim 16, delete "reselected," and insert --reselect,--.

Signed and Sealed this
Seventh Day of June, 2016

Michelle K. Lee
*Director of the United States Patent and Trademark Office*